United States Patent
Song

(10) Patent No.: US 10,905,212 B2
(45) Date of Patent: Feb. 2, 2021

(54) MULTI-FUNCTIONAL STORAGE BOX

(71) Applicant: NINGBO HAPPINESS STATIONERY CO., LTD., Ningbo (CN)

(72) Inventor: Changyou Song, Ningbo (CN)

(73) Assignee: NINGBO HAPPINESS STATIONERY CO., LTD., Ningbo (CN)

( * ) Notice: Subject to any disclaimer, the term of this patent is extended or adjusted under 35 U.S.C. 154(b) by 21 days.

(21) Appl. No.: 16/282,132

(22) Filed: Feb. 21, 2019

(65) Prior Publication Data
US 2020/0187616 A1 Jun. 18, 2020

(30) Foreign Application Priority Data
Dec. 18, 2018 (CN) .......................... 2018 1 1548412

(51) Int. Cl.
| | |
|---|---|
| A45C 11/34 | (2006.01) |
| A45C 13/02 | (2006.01) |
| A45C 13/10 | (2006.01) |
| A45C 11/00 | (2006.01) |

(52) U.S. Cl.
CPC .............. *A45C 11/34* (2013.01); *A45C 13/02* (2013.01); *A45C 13/1069* (2013.01); *A45C 2011/002* (2013.01); *A45C 2200/15* (2013.01)

(58) Field of Classification Search
CPC ..... A45C 11/34; A45C 2200/15; A45C 11/36; A45C 13/02; A45C 13/1069; A45C 2011/002; B65D 5/66; B65D 5/667

USPC ....... 206/762, 736, 747, 233, 749, 750, 766, 206/774, 1.7, 1.8, 371, 745; 220/520; 229/120.02, 122, 190, 120.09

See application file for complete search history.

(56) References Cited

U.S. PATENT DOCUMENTS

| | | | | |
|---|---|---|---|---|
| 2,005,278 A | * | 6/1935 | Trimble | B65D 85/1063 206/750 |
| 3,386,607 A | * | 6/1968 | Keene | B65D 81/025 220/516 |
| 4,618,090 A | * | 10/1986 | Cortellucci | B65D 43/162 220/326 |

(Continued)

FOREIGN PATENT DOCUMENTS

| | | |
|---|---|---|
| CN | 202337409 U | 7/2012 |
| CN | 102730262 A | 10/2012 |
| CN | 206119490 U | 4/2017 |

*Primary Examiner* — Rafael A Ortiz
(74) *Attorney, Agent, or Firm* — Innovation Capital Law Group, LLP; Vic Lin

(57) ABSTRACT

A multi-functional storage box, comprising: a first body comprising a first bottom plate and a first side wall, wherein the first side wall is provided on the first bottom plate to form a first side opening; a second body comprising a second bottom plate and a second side wall, wherein the second side wall is provided on the second bottom plate to form a second side opening; the second side opening abuts against the first side opening, the first body and the second body are enclosed to form an upward-opening receiving cavity; one end and the other end of the second side wall respectively adjoins one end and the other end of the first side wall to respectively form a left and a right wall of the receiving cavity; a flipped cover connected to the left wall or the right wall of the receiving cavity.

16 Claims, 20 Drawing Sheets

(56) References Cited

U.S. PATENT DOCUMENTS 5,096,056 A * 3/1992 Garcia ............... A45C 13/02
206/455
2006/0266815 A1* 11/2006 Coltri-Johnson ...... B65D 5/445
229/242

* cited by examiner

MULTI-FUNCTIONAL STORAGE BOX

The present application claims the priority of the Chinese Patent Application No. 201811548412.3 titled "A Multi-functional Storage Box", filed on Dec. 18, 2018, the entire disclosure of which is incorporated herein by reference.

BACKGROUND OF THE INVENTION

1. Technical Field

The present invention relates to the technical field of pencil boxes, and more particularly, to a multi-functional storage box.

2. Description of Related Art

Students often use pencil boxes to hold pens, pencils, rulers, erasers and other stationery. These types of pencil boxes are characterized in that they have a single function; according to the needs of different users, some multi-functional pencil boxes have gradually appeared on the market; as intelligent products are getting more and more popular, electronic products such as mobile phones and tablet computers have become necessities for students. Therefore, it is necessary to design a multi-functional storage box which can serve as an ordinary pencil box having a storage function and is convenient for users to use electronic products such as mobile phones.

A multi-functional pencil box disclosed in Patent No. "CN206119490U" comprises a cover, a body and a lifting rod provided on a side wall of the body, wherein the cover comprises a first cover located at the bottom and second cover connected with the first cover by way of a living sheet connection, with the inner wall of the second cover further provided with a storage bag; the body located on the first cover is an upward-opening box, the inside of which is provided with an upward-opening receiving slot, and the receiving slot is a receiving slot having at least one opening on the surface. The utility model provides a multi-functional pencil box capable of realizing the stationery storage function of a traditional pencil box and simultaneously realizing integrated movement, neat collection of stationery, safe storage of glasses, timely acquisition of time information, theft prevention, positioning and winter heating. The multi-functional pencil box with a complicated structure has a high cost, and it cannot meet the needs of student users to use electronic products such as mobile phones.

In order to solve the deficiencies of the prior art, it is necessary to design a multi-functional storage box with a simple structure, which is economical and practical, and convenient for users to use electronic products such as mobile phones.

BRIEF SUMMARY OF THE INVENTION

In order to solve the deficiencies of the prior art, the objective of the present invention is to design a multi-functional storage box with a simple structure, which is economical and practical, and convenient for users to use electronic products such as mobile phones.

The technical solution adopted in the present invention is to provide a multi-functional storage box which comprises a first body comprising a first bottom plate and a first side wall, wherein the first side wall is provided on the first bottom plate to form a first side opening; a second body comprising a second bottom plate and a second side wall, wherein the second side wall is provided on the second bottom plate to form a second side opening; the second bottom plate adjoins the first bottom plate, and both the first bottom plate and the second bottom plate can be folded down along the joint; the second side opening abuts against the first side opening, so that the first body and the second body are enclosed to form an upward-opening receiving cavity; one end of the second side wall adjoins one end of the first side wall to form a left wall of the receiving cavity, and the other end of the second side wall adjoins the other end of the first side wall to form a right wall of the receiving cavity;

a flipped cover connected to the left wall or the right wall of the receiving cavity, wherein the flipped cover can be reversed to cover the opening of the receiving cavity.

In the above multi-functional storage box, the first side wall comprises a first sealing plate and two first side plates, wherein the one first side plate is connected to the left side of the first bottom plate, and the other first side plate is connected to the right side of the first bottom plate, with the first sealing plate connected between the two first side plates.

In the above multi-functional storage box, the second side wall comprises a second sealing plate and two second side plates, wherein the one second side plate is connected to the left side of the second bottom plate, and the other second side plate is connected to the right side of the second bottom plate, with the second sealing plate connected between the two second side plates.

In the above multi-functional storage box, the flipped cover comprises a connecting plate and a flipped plate, wherein the connecting plate is connected to the second side plate, and the connecting plate and the first side plate form an overlapping area.

In the above multi-functional storage box, magnets having opposite magnetic poles are respectively provided in the connecting plate at the overlapping area and in the first side plate at the overlapping area.

In the above multi-functional storage box, the first bottom plate and the second bottom plate are provided with magnets for adsorbing and pasting the first bottom plate and the second bottom plate after the first bottom plate or the second bottom plate is folded.

In the above multi-functional storage box, a suction plate extends out of the flipped plate away from one side of the connecting plate; when the flipped plate is covered on the opening of the receiving cavity, the suction plate fits the first and second side plates away from the connecting plate.

In the above multi-functional storage box, a magnet is provided in the suction plate, and magnets with magnetic poles opposite to those in the suction plate are provided in the first and second side plates away from the side of the connecting plate.

In the above multi-functional storage box, the first body further comprises a C-shaped cover, wherein one end of the C-shaped cover is connected to the one first side plate, and the other end of the C-shaped cover is connected to the other first side plate.

In the above multi-functional storage box, a base is provided in the first body for longitudinally placing the mobile phone in the base, and the base and the C-shaped cover enclose a limiting cavity.

In the above multi-functional storage box, the first sealing plate is provided with a first socket and a first through slot, and the second sealing plate is provided with a second socket and a second through slot; when the first body and/or the second body are folded, the first through slot and the second through slot are in communication and used for the data line to be passed through.

In the above multi-functional storage box, two slots are symmetrically opened on the two first side plates adjacent to the side of the first side opening, with the openings of the slots facing the second body.

In the above multi-functional storage box, the slot is used for fixing a mobile phone which can be laterally placed in the slot; the first side plate is provided with a regulator for adjusting the tilting angle of the mobile phone fixed in the slot.

In the above multi-functional storage box, the regulator comprises a revolving pin and at least one adjusting block, wherein the adjusting block is hinged on the first side plate by the revolving pin.

In the above multi-functional storage box, the first bottom plate and the second bottom plate are connected by way of a connection, wherein the connection comprises a folded plate and an end plate connected at both ends of the folded plate; the one end plate is connected to the first sealing plate while the other end plate is connected to the second sealing plate, and the folded plate is connected to the bottoms of the first bottom plate and the second bottom plate.

In the above multi-functional storage box, a storage bag is provided on the inner side of the flipped plate and/or the first bottom plate.

In the above multi-functional storage box, a snap is provided on the outer side of the flipped plate.

In the above multi-functional storage box, a magnetic plate is provided on the inner side of the flipped plate and hinged on the flipped plate through a holder; the magnetic plate is used for adjusting the tilting angle of a mobile phone placed in the base or the slot and for fixing the mobile phone.

In the above multi-functional storage box, the first side opening and/or the second side opening are provided with a baffle for separating the receiving cavity.

In the above multi-functional storage box, the first body, the second body and the flipped cover are enclosed into a cuboid or semi-cylinder.

Compared with the prior art, the beneficial effects of the present invention are as follows:

In the multi-functional storage box in the present invention, the first body and the second body can be folded by 0~180 degrees, and a foldable flipped cover is provided on the opening of the receiving cavity and has a double-folding function; upon the opening and closure of the flipped cover, the storage box is used as an ordinary pencil box; when the first body or the second body is folded, the storage box can be used as a pencil holder, with the first side wall provided with a slot, so that when a video needs to be viewed across a mobile phone, the mobile phone is placed laterally in the slot, and a regulator is further provided for adjusting the tilting angle of the mobile phone; the first body is provided with a base, and the base and the C-shaped cover enclose a limiting cavity, so that when a video chat is needed, the base is used for vertically placing the mobile phone; the first cover is provided with a first socket while the second cover is provided with a second socket, with a charger placed in the second body, and a mobile phone is placed in a slot or a base to realize the use of the mobile phone during a charging process; the storage box of a simple structure has a smart design, and it is economical and practical, and is convenient for users to use electronic products such as mobile phones.

Figure 1:
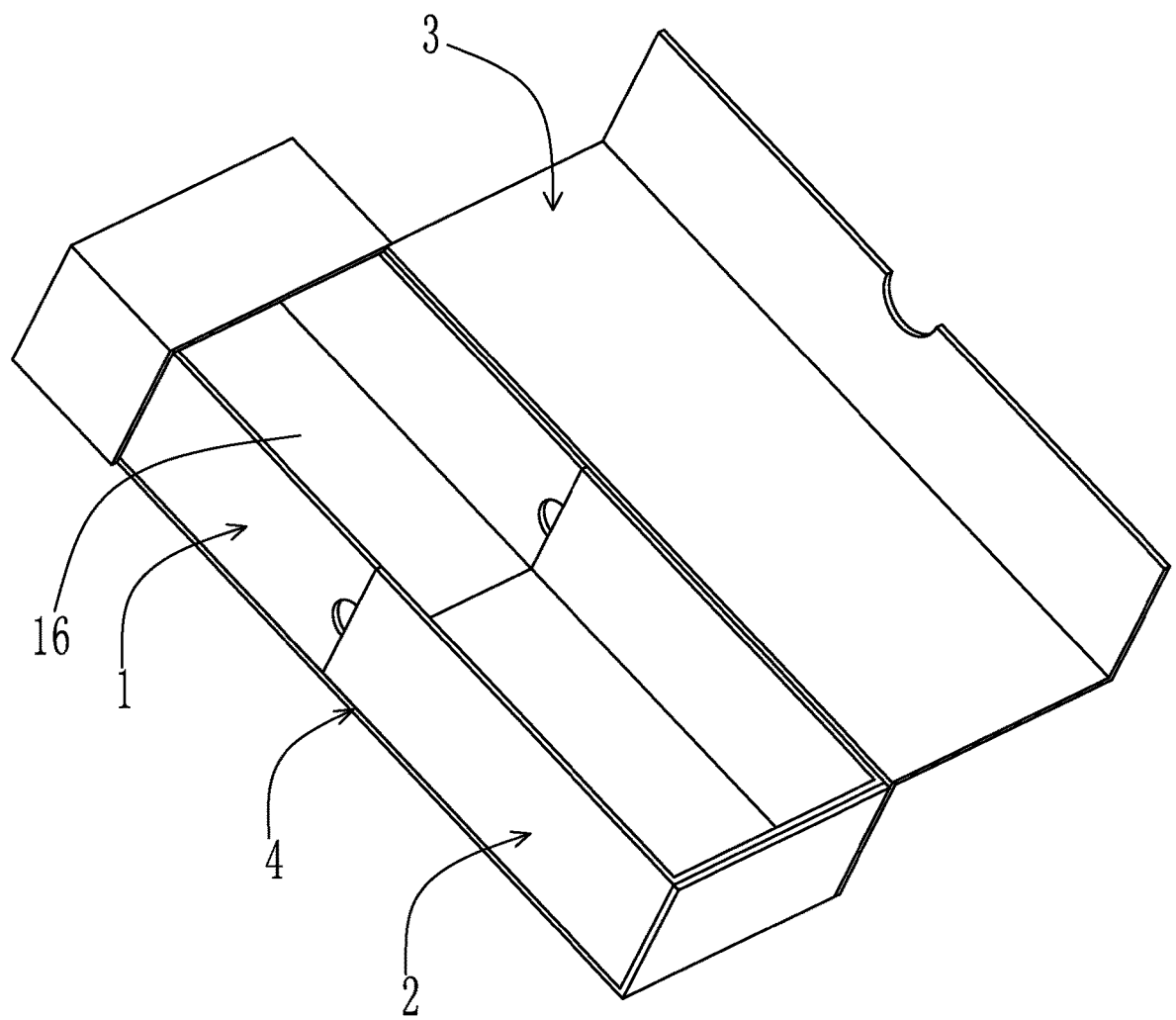
FIG. 1 is a schematic structural view of the flipped cover of a pencil box in a folded state according to the present invention.

In the figures, 1—first body; 11—first bottom plate; 12—first side wall; 121—first sealing plate; 1211—first socket; 1212—first through slot; 122—first side plate; 123—slot; 13—first side opening; 14—C-shaped cover; 15—base; 145—limiting cavity; 16—receiving cavity; 161—left wall; 162—right wall; 2—second body; 21—second bottom plate; 22—second side wall; 221—second sealing plate; 2211—second socket; 2212—second through slot; 222—second side plate; 23—second side opening; 3—flipped cover; 31—connecting plate; 32—flipped plate; 321—suction plate; 322—snap; 323—magnetic plate; 324—holder; 33—overlapping area; 34—storage bag; 4—connection; 41—folded plate; 42—end plate; 5—regulator; 51—revolving pin; 52—adjusting block; 6—baffle; 7—magnet.

DETAILED DESCRIPTION OF THE INVENTION

The technical solution of the present invention is further detailed in combination with the drawings and the embodiments as below, but these embodiments are not intended to limit the present invention.

As shown in FIG. 1-20, a multi-functional storage box comprises a first body 1, a second body 2 and a flipped cover 3; a storage box which is composed of a first body 1, a second body 2 and a flipped cover 3 is the most basic one in the invention.

A first body 1 comprises a first bottom plate 11 and a first side wall 12, wherein the first side wall 12 is provided on the first bottom plate 11 to form a first side opening 13.

A second body 2 comprises a second bottom plate 21 and a second side wall 22, wherein the second side wall 22 is provided on the second bottom plate 21 to form a second side opening 23; the second bottom plate 21 adjoins the first bottom plate 11, and both the first bottom plate 11 and the second bottom plate 21 can be folded down along the joint, so that the folding angle can reach 0~180 degrees; the second side opening 23 abuts against the first side opening 13, so that the first body 1 and the second body 2 are enclosed to form an upward-opening receiving cavity 16; one end of the second side wall 22 adjoins one end of the first side wall 12 to form a left wall 161 of the receiving cavity 16, and the other end of the second side wall 22 adjoins the other end of the first side wall 12 to form a right wall 162 of the receiving cavity 16. One of the most preferable solutions is that the size of the first bottom plate 11 is equal to the size of the second bottom plate 21; that is, the length, width and height of the first body 1 and the second body 2 are equal.

A flipped cover 3 is connected to the left wall 161 or the right wall 162 of the receiving cavity 16, wherein the flipped cover 3 can be reversed to cover the opening of the receiving cavity 16. The length of the flipped cover 3 is greater than the length of the first bottom plate 11 and the second bottom plate 21.

The first side wall 12 comprises a first sealing plate 121 and two first side plates 122, wherein the one first side plate 122 is connected to the left side of the first bottom plate 11, and the other first side plate 122 is connected to the right side of the first bottom plate 11, with the first sealing plate 121 connected between the two first side plates 122.

The second side wall 22 comprises a second sealing plate 221 and two second side plates 222, wherein the one second side plate 222 is connected to the left side of the second bottom plate 21, and the other second side plate 222 is connected to the right side of the second bottom plate 21, with the second sealing plate 221 connected between the two second side plates 222; both ends of the first side wall 12 and the second side wall 22 abut against each other.

Figure 2:
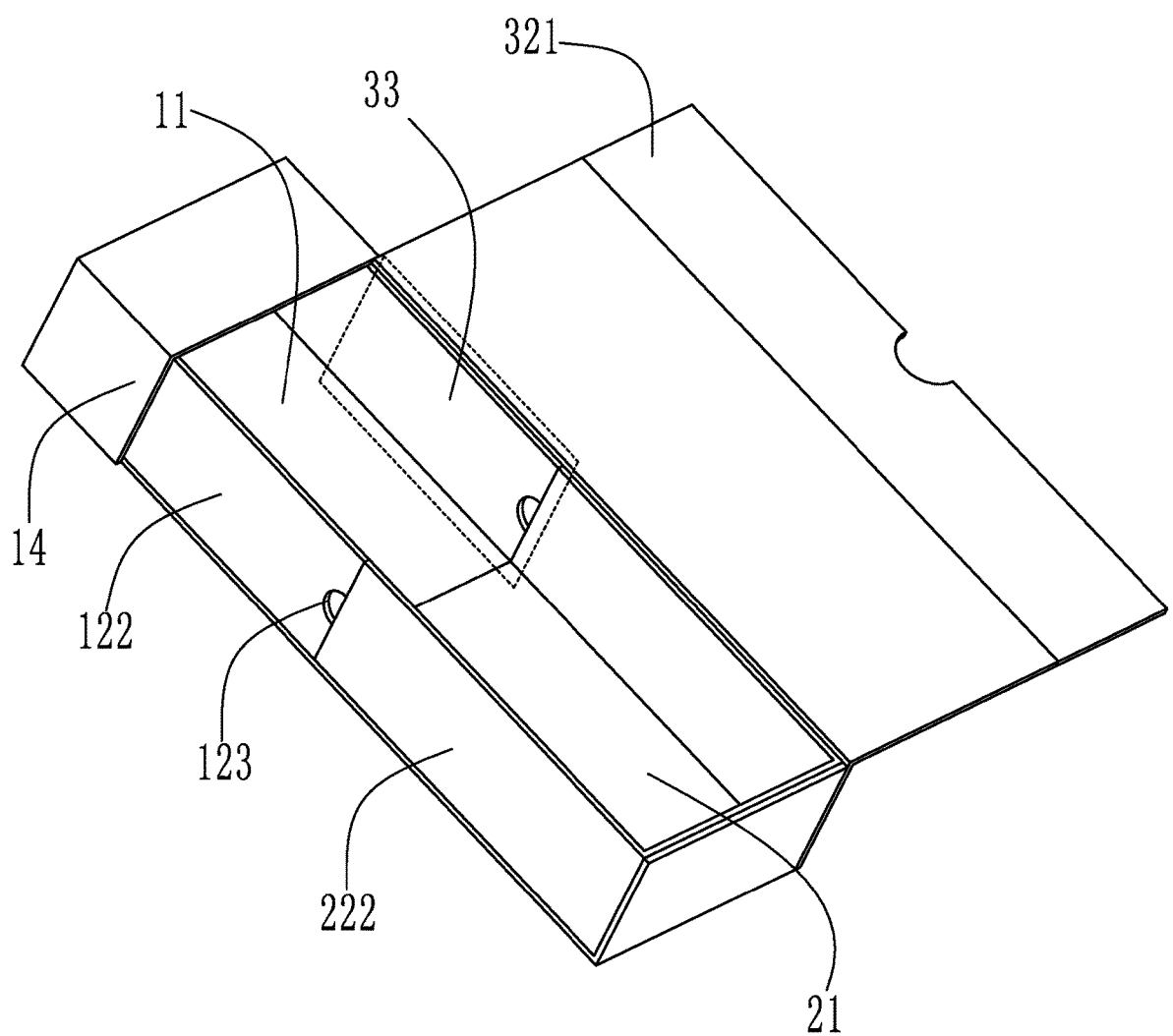
FIG. 2 is a schematic structural view of the fully extended suction cover in FIG. 1.
Figure 3:
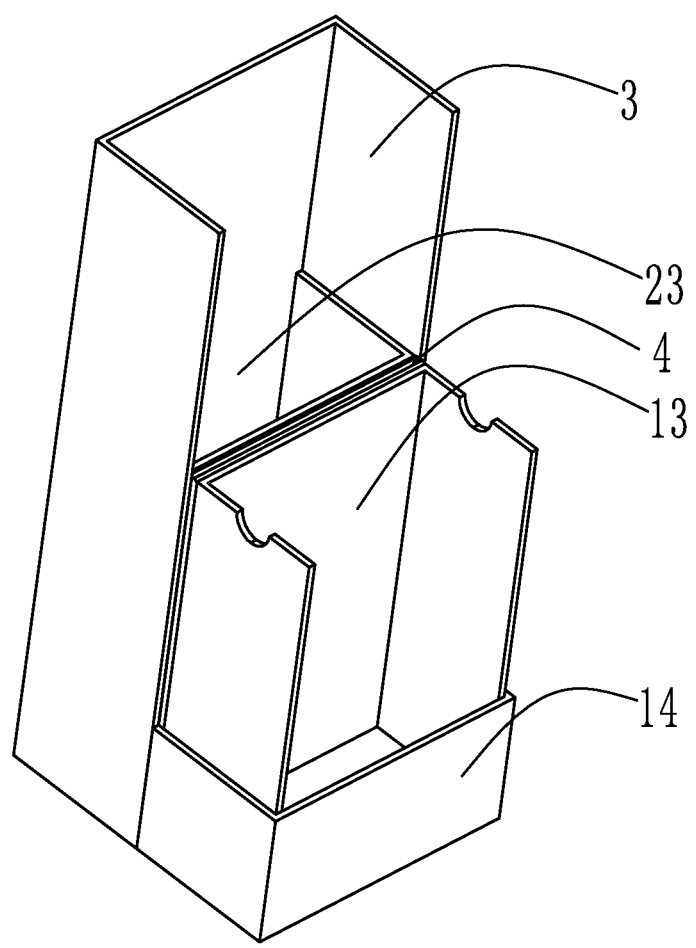
FIG. 3 is a schematic structural view of the present invention when used as a pencil holder.
Figure 4:
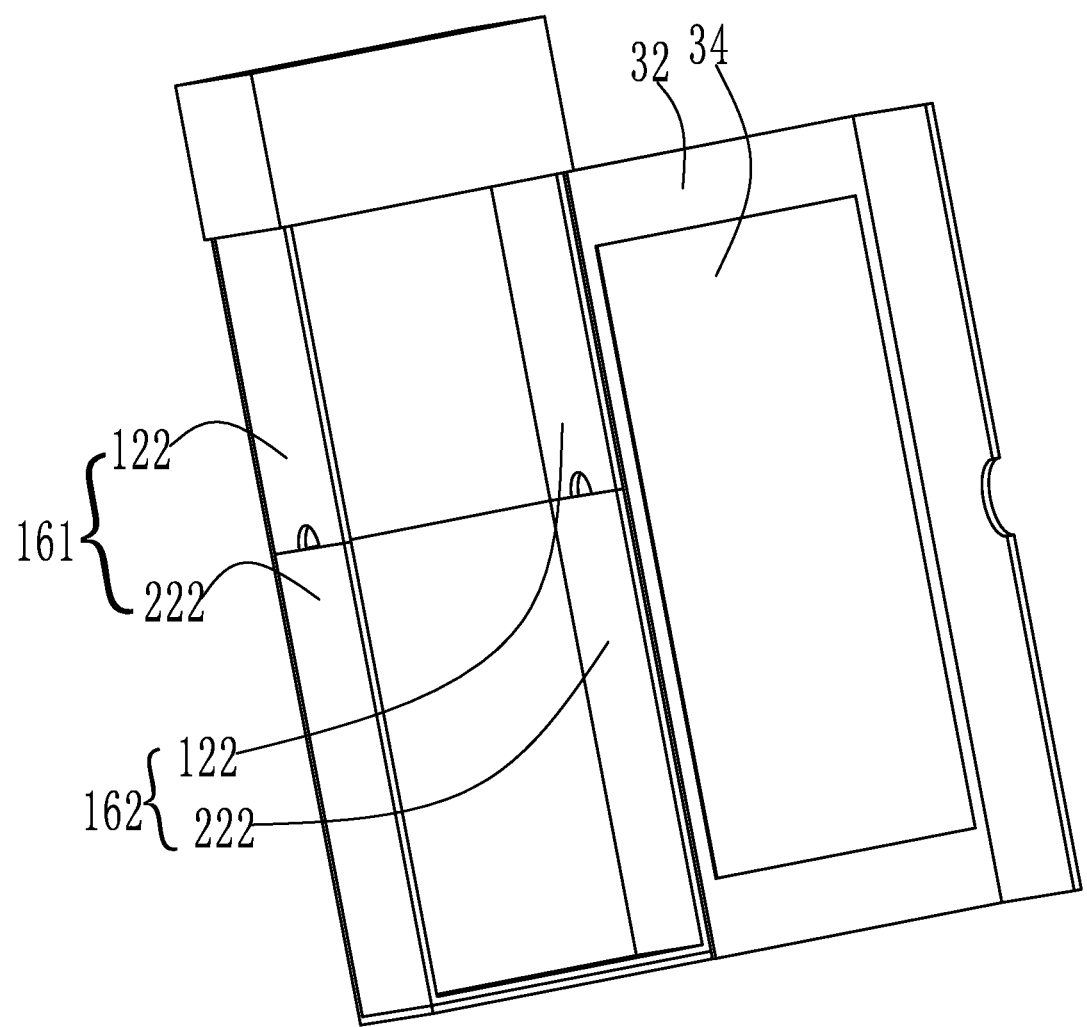
FIG. 4 is a schematic structural view of the storage bag provided in the flipped plate in FIG. 1.
Figure 5:
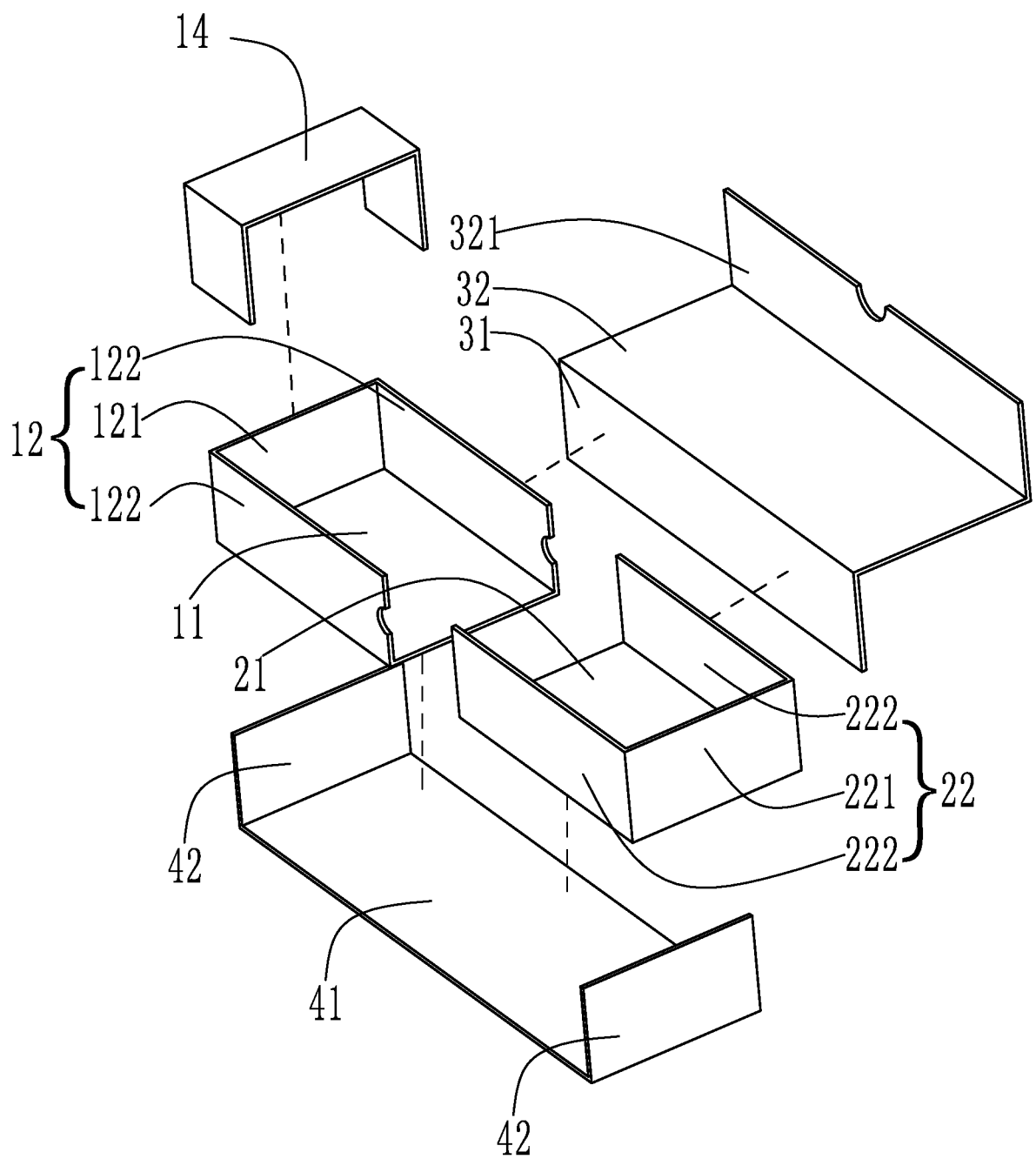
FIG. 5 is an explosive view of FIG. 1.
Figure 6:
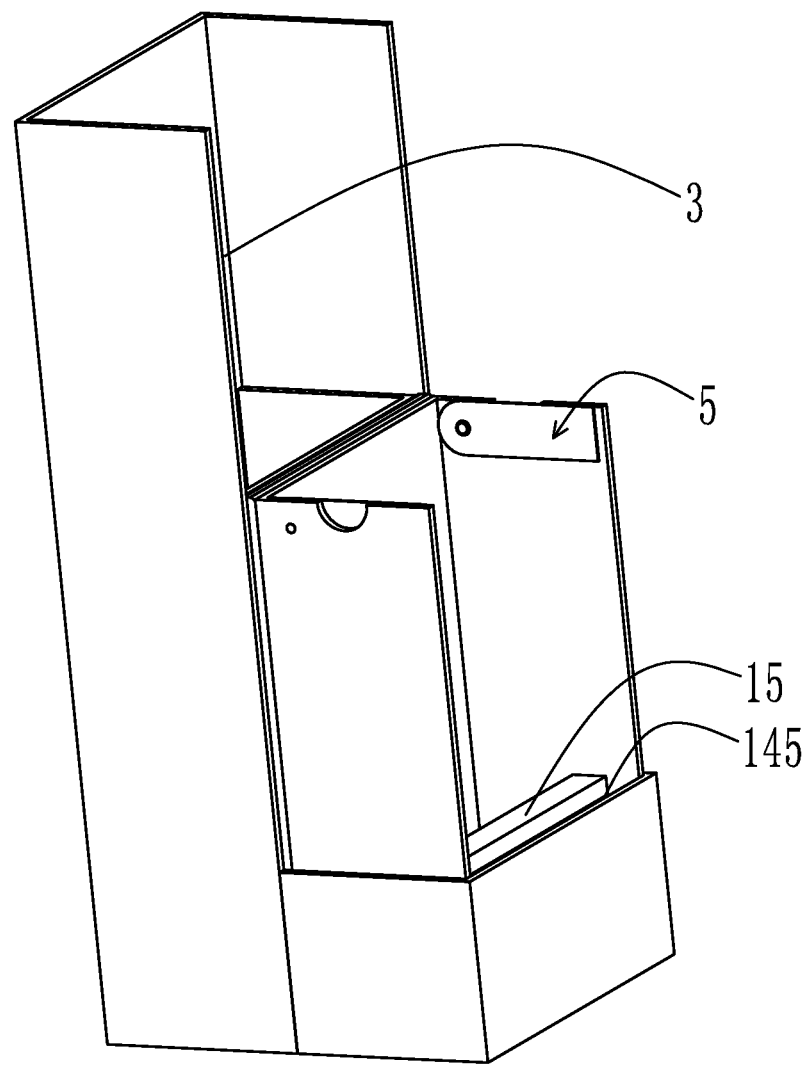
FIG. 6 is a schematic structural view of the present invention when used as a mobile phone holder.
Figure 7:
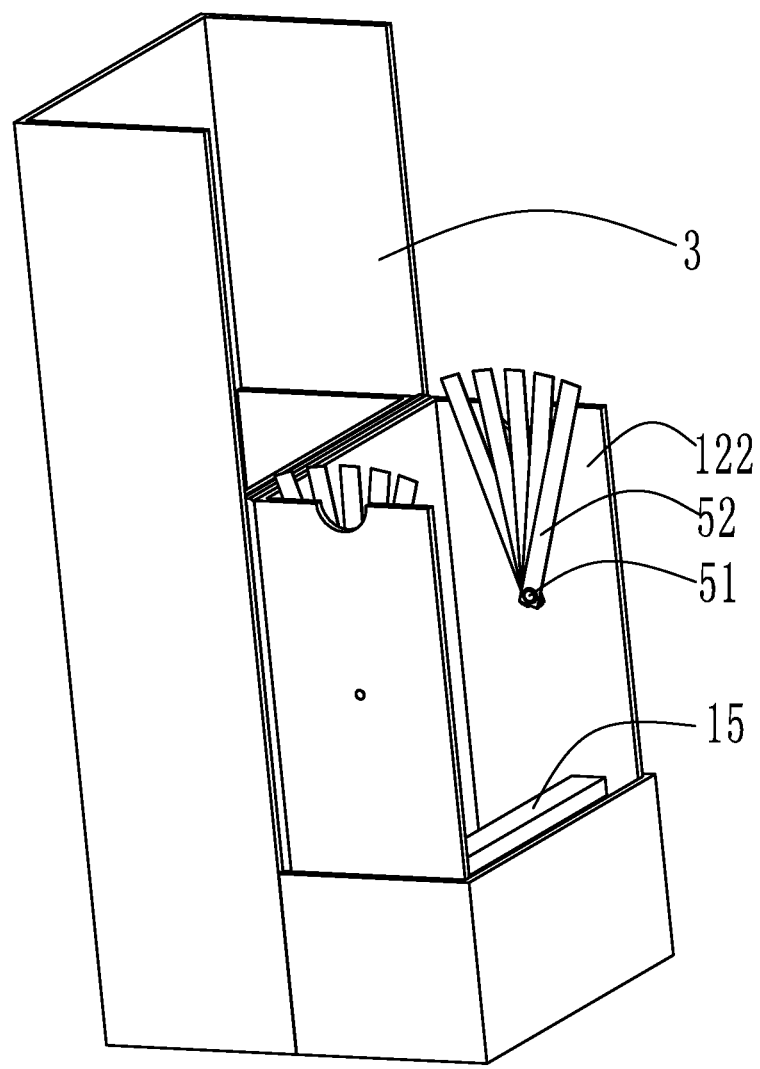
FIG. 7 is a schematic structural view of the present invention in another state when used as a mobile phone holder.

The flipped cover 3 comprises a connecting plate 31 and a flipped plate 32, wherein the connecting plate 31 is connected to the second side plate 222, and the connecting plate 31 and the first side plate 122 form an overlapping area 33, as shown in a dashed box in FIG. 2. Magnets 7 having opposite magnetic poles are provided in the connecting plate 31 at the overlapping area 33 and in the first side plate 122 at the overlapping area 33. When the first body 1 and the second body 2 are not folded, the first side plate 122 and the second side plate 222 near the side of the flipped cover 3 are adjacent, and the magnet 7 in the connecting plate 31 at the overlapping area 33 and the magnet 7 in the first side plate 122 at the overlapping area 33 are attracted to each other, so that the first body 1 and the second body 2 are sucked and abutted against each other, being firmly secured to prevent from being bent.

The first bottom plate 11 and the second bottom plate 21 are provided with magnets 7 for adsorbing and pasting the first bottom plate 11 and the second bottom plate 21 after the first bottom plate 11 or the second bottom plate 21 is folded; that is, when the first body 1 and the second body 2 are folded and used as a pencil holder or a mobile phone holder, the first bottom plate 11 and the second bottom plate 21 fit each other without displacement.

A suction plate 321 extends out of the flipped plate 32 away from one side of the connecting plate 31, wherein the suction plate 321 can be bent or flattened; when the flipped plate 32 is covered on the opening of the receiving cavity 16, the suction plate 321 fits the first side plate 122 away from the side of the connecting plate 31 and the second side plate 222 away from the side of the connecting plate 31. A magnet 7 is provided in the suction plate 321, and magnets 7 with magnetic poles opposite to those in the suction plate 321 are provided in the first side plate 122 and the second side plate 222 away from the side of the connecting plate 31. When the flipped plate 3 is covered over the opening of the receiving cavity 16, the suction plate 321 is sucked and attached to the first side plate 122 and the second side plate 222, so that the articles stored in the receiving cavity 16 are not poured out. The end of the suction plate 321 defines a semi-circular opening slot for folding the flipped cover 3 from the opening of the receiving cavity 16; the shape of the opening slot is not limited to a semi-circular shape, and may be a rectangle or the like.

The first body 1 further comprises a C-shaped cover 14 provided on the first side wall 12, wherein one end of the C-shaped cover 14 is connected to the onefirst side plate 122, and the other end of the C-shaped cover 14 is connected to the other first side plate 122. Specifically, it can be connected by way of glue adhesion or the like. The C-shaped cover 14 and the flipped cover 3 are provided side by side to close the opening of the receiving cavity 16, so as to prevent small objects, such as an eraser, placed in the first body 1 and the second body 2 from falling out from the opening. Preferably, the C-shaped cover 14 is provided so that one end of the C-shaped cover 14 is fixed to the one first side plate 122 while the other end of the C-shaped cover is fixed to the other first side plate 122. Another arrangement of the C-shaped cover 14 is that one end of the C-shaped cover is fixed to a first side plate 122 while the other end is attracted to the other first side plate 122 by way of a magnet 7; that is, the C-shaped cover can also be folded and opened. The first body 1 is provided with a base 15 for longitudinally placing the mobile phone in the base 15; when the mobile phone is longitudinally provided in the base 15, the back of the mobile phone rests on the first bottom plate 11; the base 15 and the C-shaped cover 14 enclose a limiting cavity 145 used for limiting the displacement of the mobile phone, particularly suitable for use when the mobile phone is vertically located, such as a WeChat video chat, simple dressing, and electronic novel reading.

Two slots 123 are symmetrically opened on the two first side plates 122 adjacent to the side of the first side opening 13, with the openings of the slots 123 facing the second body 2. The slot 123 is used for fixing the mobile phone, particularly suitable for laterally fixing the mobile phone; the first side plate 122 is provided with a regulator 5 for adjusting the tilting angle of the mobile phone fixed in the slot 123, to fit users with different sitting postures or of different heights. The regulator 5 comprises a revolving pin 51 and at least one adjusting block 52 which is hinged on the first side plate 122 by way of the rotating pin 51, and the tilting angle of the mobile phone fixed in the slot 123 can be adjusted by way of rotating the adjusting block 52. When there are a plurality of adjusting blocks 52, the adjusting block 52 can force the change of the tilting angle of the mobile phone placed in the slot 123 directly by way of adjusting the adjusting block 52;

when there are a plurality of adjusting blocks 52, the tilting angle of the mobile phone placed in the slot 123 can be adjusted by way of adjusting a single adjusting block 52, and the tilting angle of the mobile phone placed in the slot 123 can also be adjusted by way of adjusting two or more adjusting blocks 52; and there are a plurality of adjusting blocks 52, adjusting blocks 52 of different lengths can be provided, thus facilitating the placement of the mobile phone on top of a plurality of the adjusting blocks 52.

The first bottom plate 11 and the second bottom plate 21 are connected by way of a connection 4 which comprises a folded plate 41 and an end plate 42 connected to both ends of the folded plate; one end plate 42 is connected to the first sealing plate 121 while the other end plate 42 is connected to the second sealing plate 221, and the folded plate 41 is connected to the bottom of the first bottom plate 11 and the second bottom plate 21. And the folded plate 41 can be folded along the intermediate position.

Figure 14:
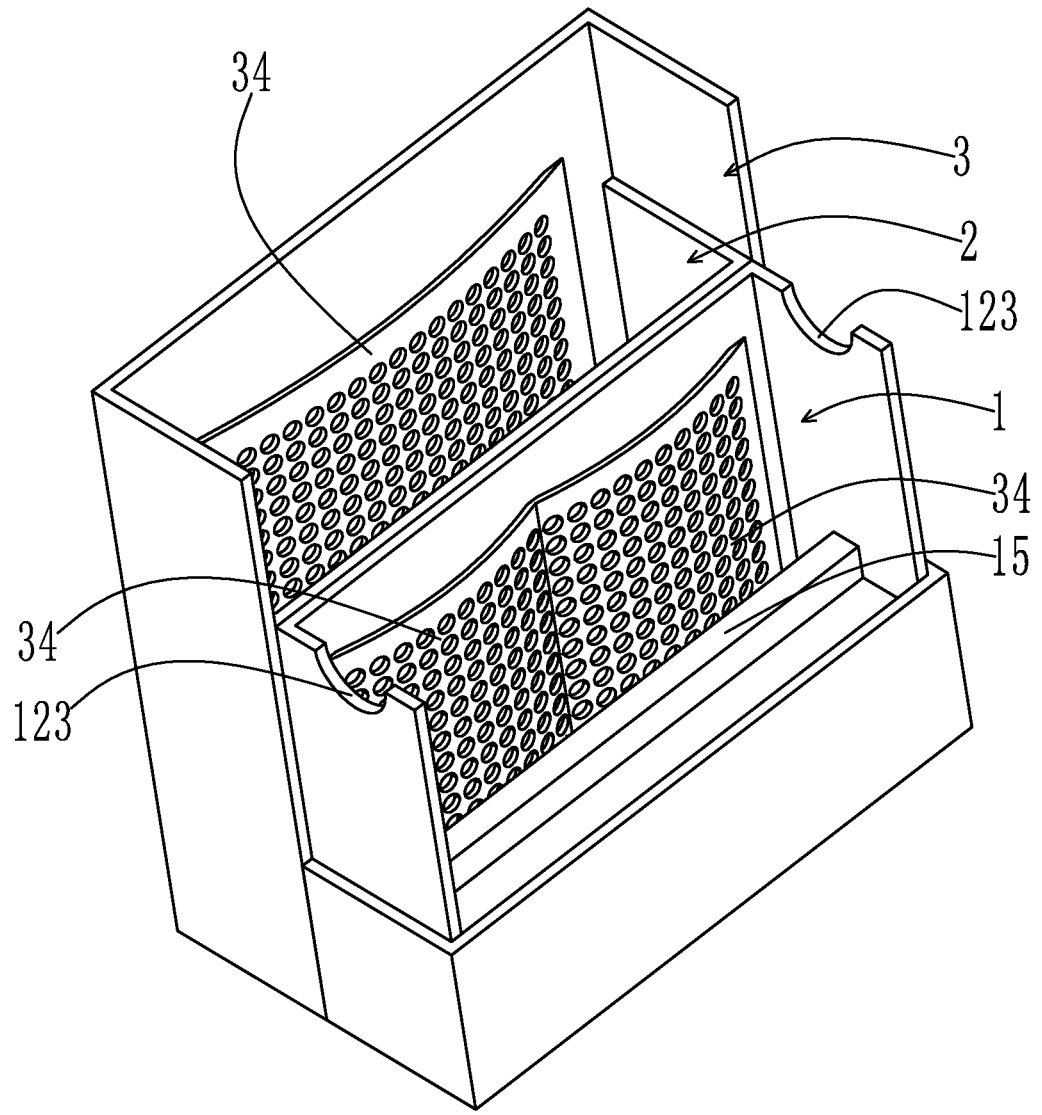
FIG. 14 is a schematic structural view of FIG. 1 when the storage bag is provided on the flipped plate and the first bottom plate.
Figure 15:
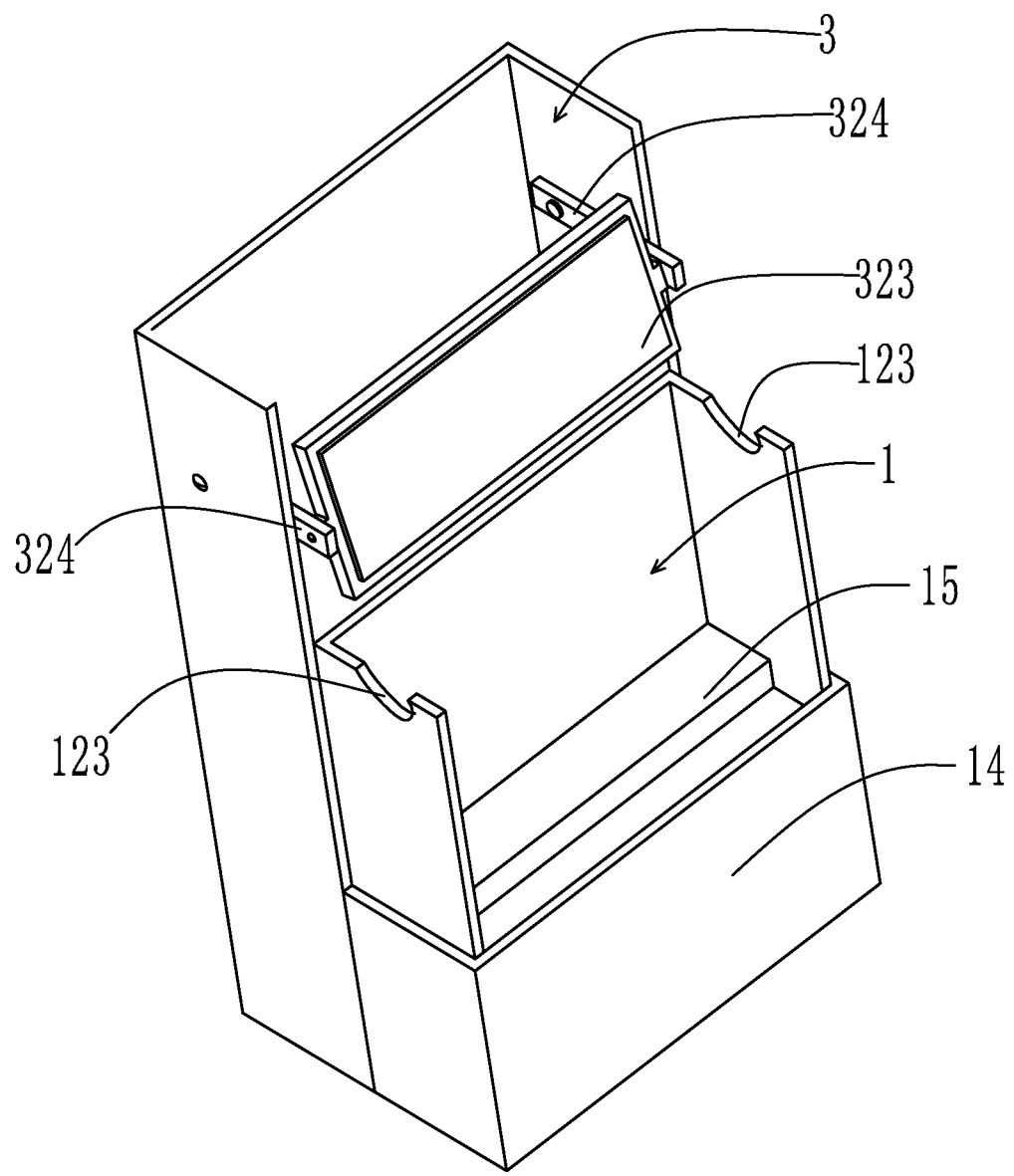
FIG. 15 is a schematic structural view of the present invention when used as a car navigation holder.
Figure 16:
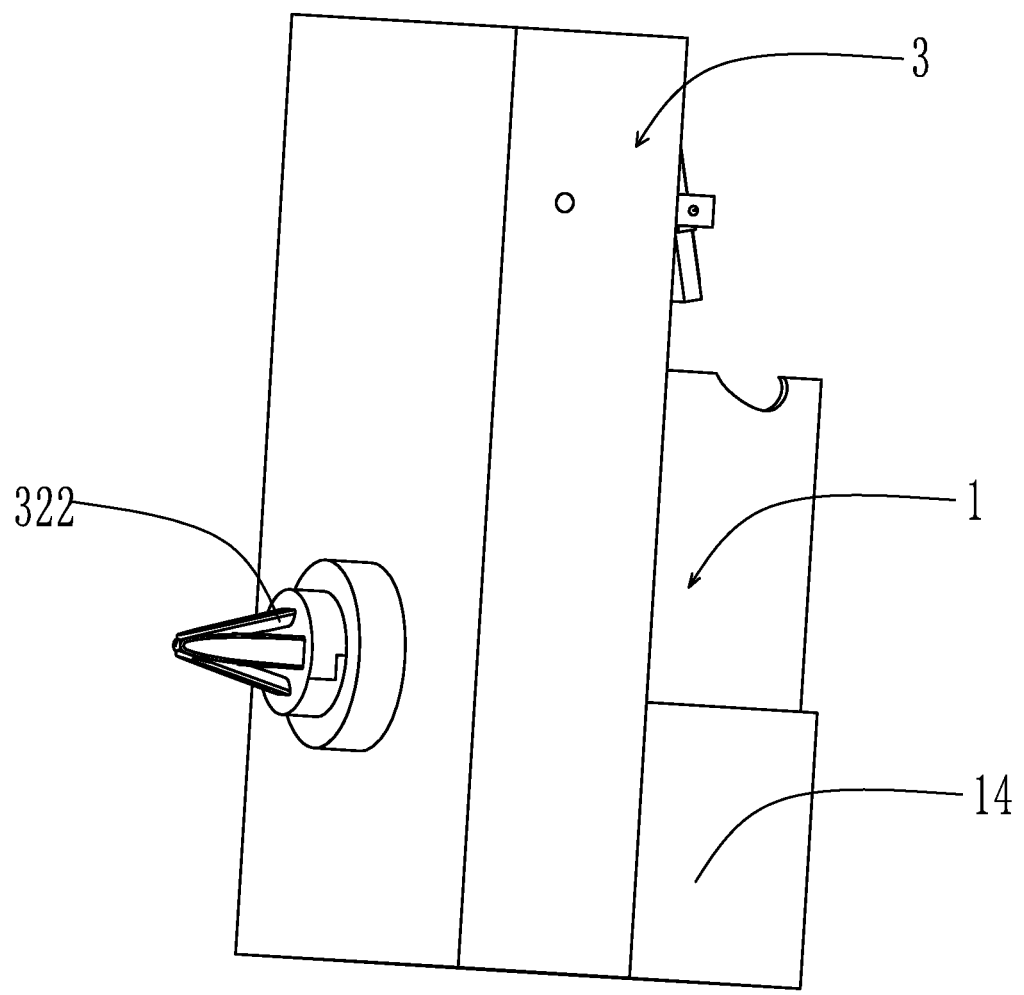
FIG. 16 is a schematic structural view of another view of FIG. 15.
Figure 17:
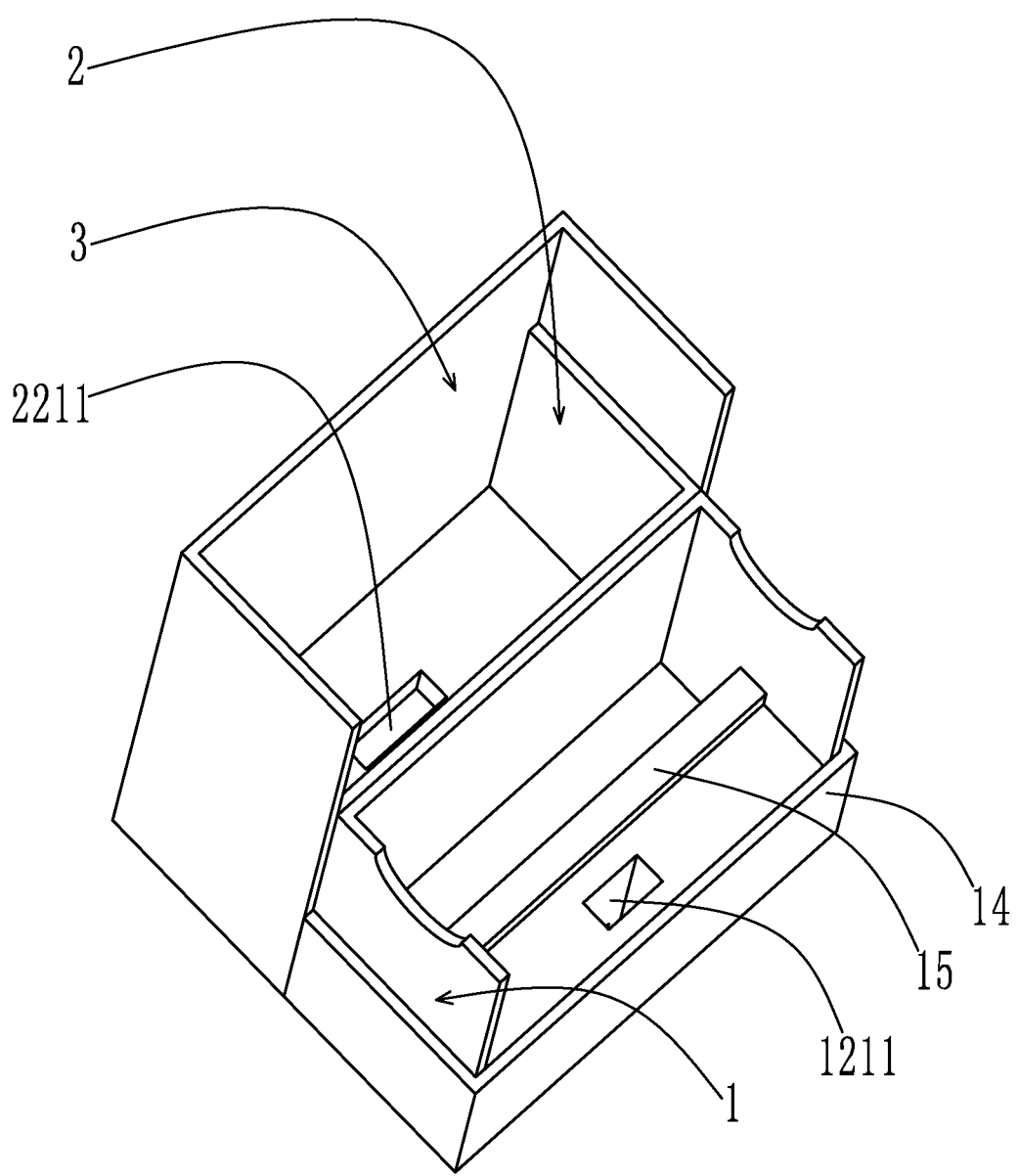
FIG. 17 is a schematic view of the first and second sockets and the first and second through slots in FIG. 6.
Figure 18:
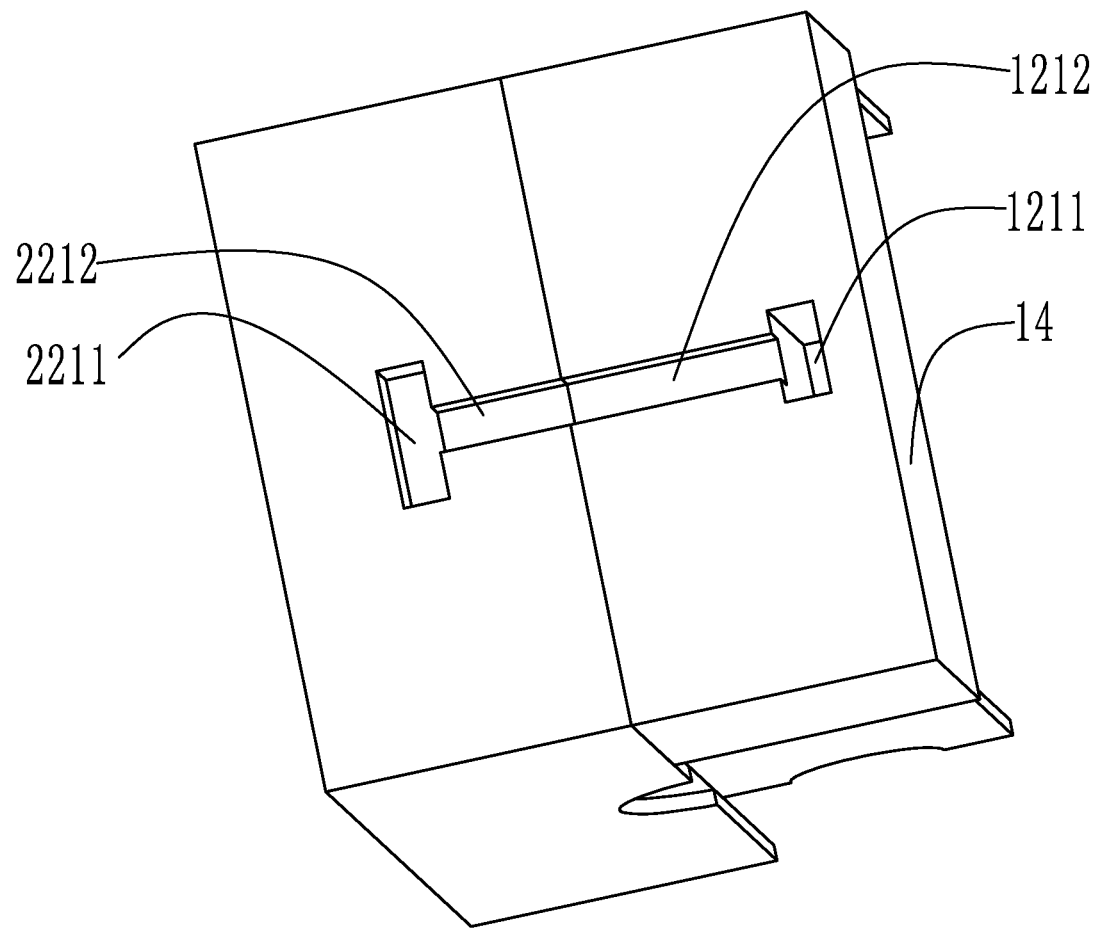
FIG. 18 is another perspective view of FIG. 17.
Figure 19:
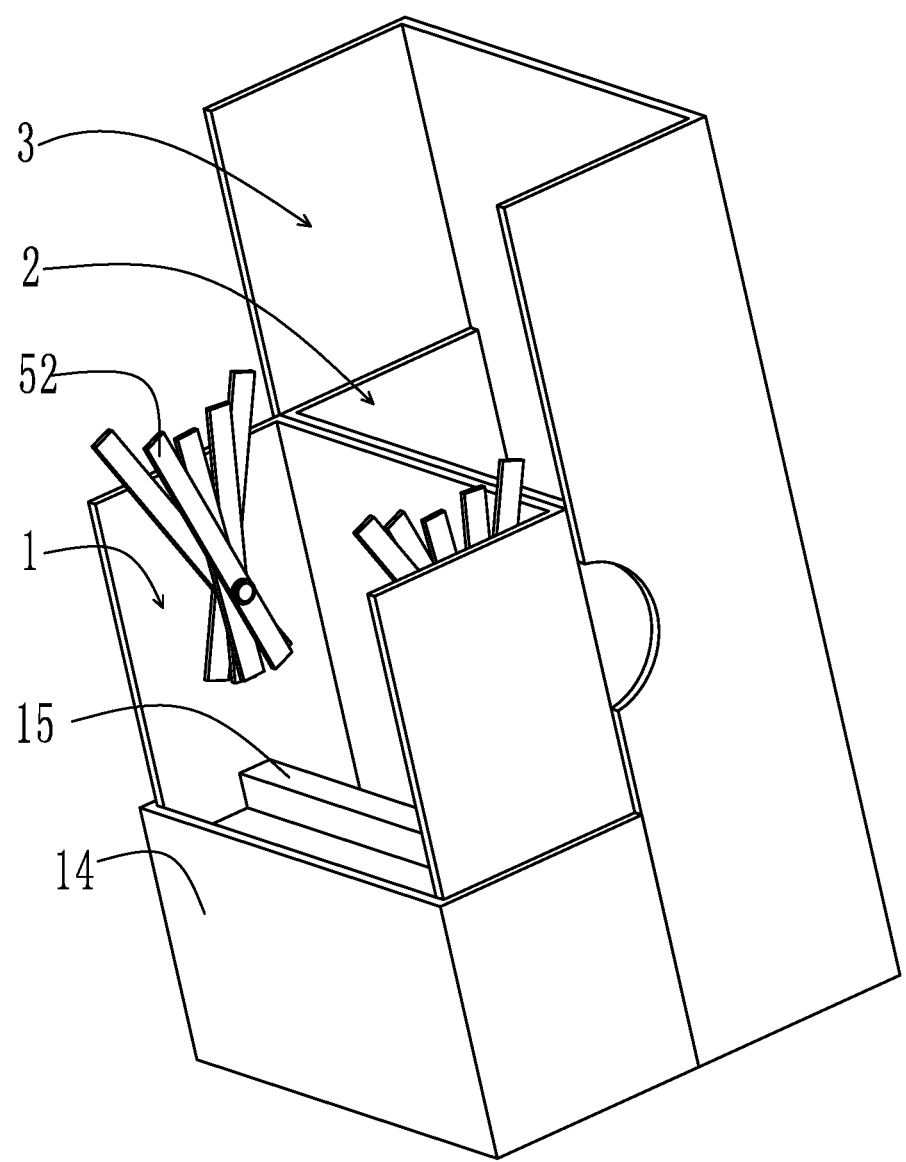
FIG. 19 is a schematic structural view of another embodiment of FIG. 7.
Figure 20:
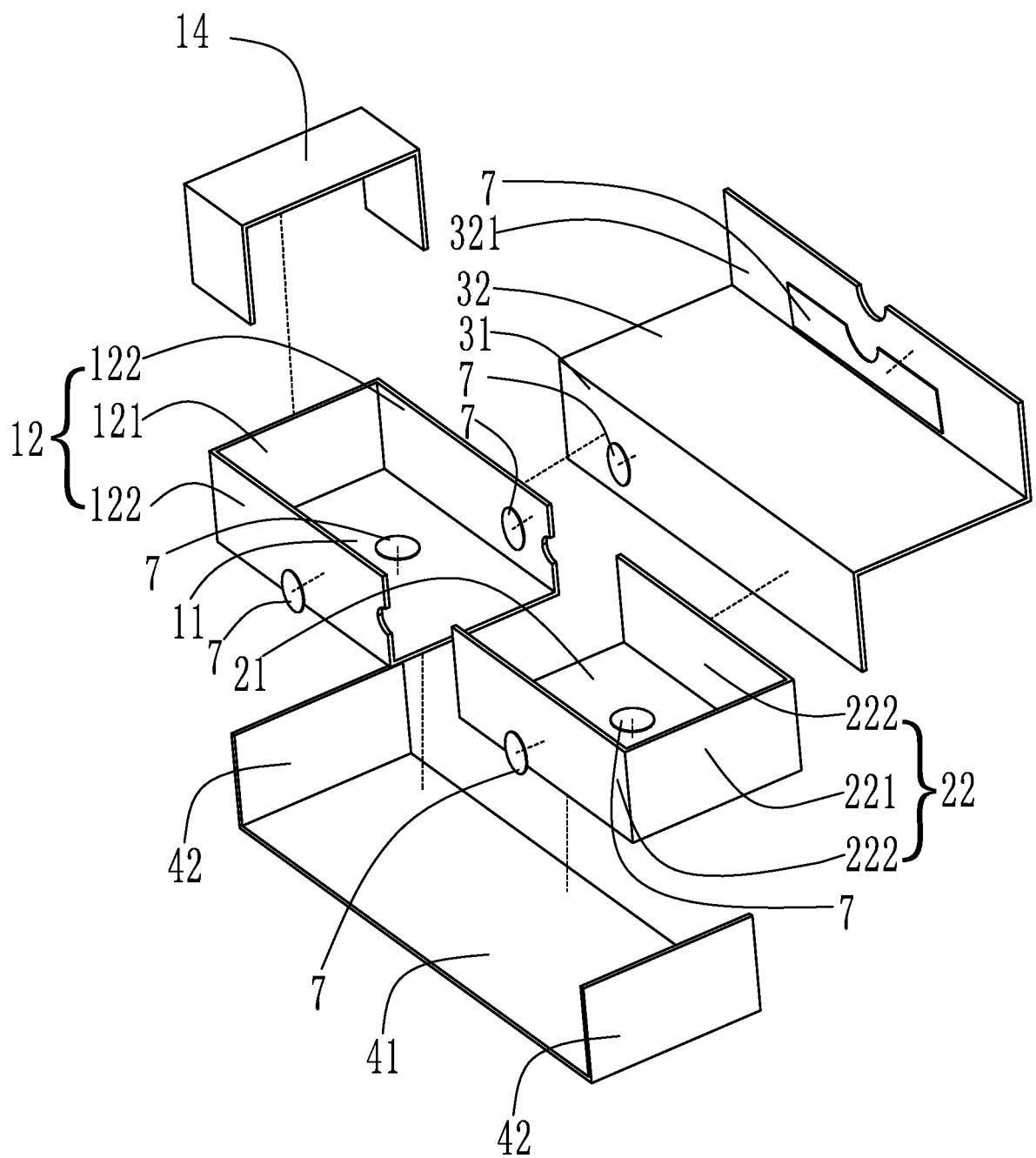
FIG. 20 is a schematic view of the distribution of the position of the magnet in FIG. 5.

A storage bag 34 is provided in the inner side of the flipped plate 32 of the flipped cover 3; the storage bag 34 is made of a transparent material for placing business cards or note memos in the transparent storage bag 34, and the flipped cover 3 can be opened for reading the information of the business cards or the note memos in the storage bag; the storage bag 34 can also be used for placing items such as data lines and headphones. Similarly, as shown in FIG. 14, a storage bag 34 can also be provided on both the first bottom plate 11 and the flipped plate 32; when the first body 1 or the second body 2 is folded by 180 degrees, the opening of the storage bag 34 faces upward to facilitate putting things into the storage bag 34; according to the size of the space occupied by the things to be stored, the storage bags 34 of different specifications on the flipped plate 32 or the first bottom plate 11 are selected.

A magnetic plate 323 is provided on the inner side of the flipped plate 32 and hinged on the flipped plate 32 by way of a holder 324; the holder 324 is detachably mounted on the flipped plate 32 and the magnetic plate 323 is used for adjusting the tilting angle of the mobile phone placed in the base 25 or the slot 123 and used for fixing the mobile phone located on the base 25 or in the slot 123; the outer side of the flipped plate 32 is provided with a snap 322 used for snapping on the air outlet of the central control plate of a car, which is convenient to fix and adjust the mobile phone and the mobile phone holder used on a car navigation; preferably, the same as an ordinary mobile phone navigation holder, the number of the snap 322 is most preferably 4, so that when the snap 322 is fixed on the air outlet of the central control plate of a car, the snap 322 is not easily loosened, and even if the car is driving on a bumpy road, the mobile phone will not be shaken. When the car navigation is not used, the magnetic plate 323 is rotated to contract the magnetic plate 323 on the flipped plate 32, and the magnetic plate 323 is in close contact with the flipped plate 32, which does not affect other functions of the storage box.

Another arrangement of the storage box is to provide a baffle 6 on the first side opening 13 and/or the second side opening 23; the baffle 6 is used for separating the receiving cavity 16; the baffle 6 can separate the receiving cavity 16 into left and right halves for placing items in categories in the separated receiving cavities 16.

Figure 8:
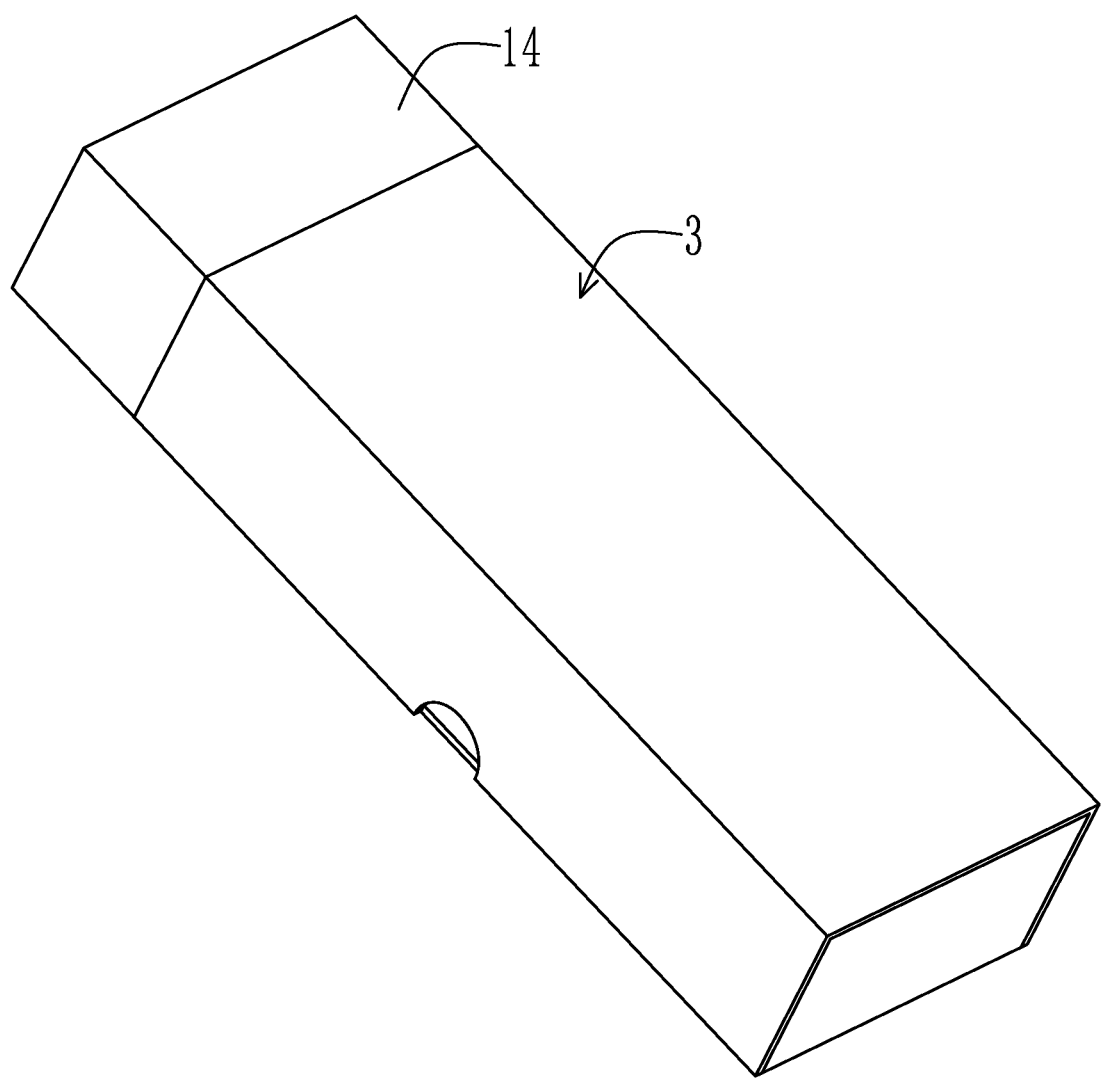
FIG. 8 is a schematic structural view of the flipped cover in FIG. 1 when closed.
Figure 9:
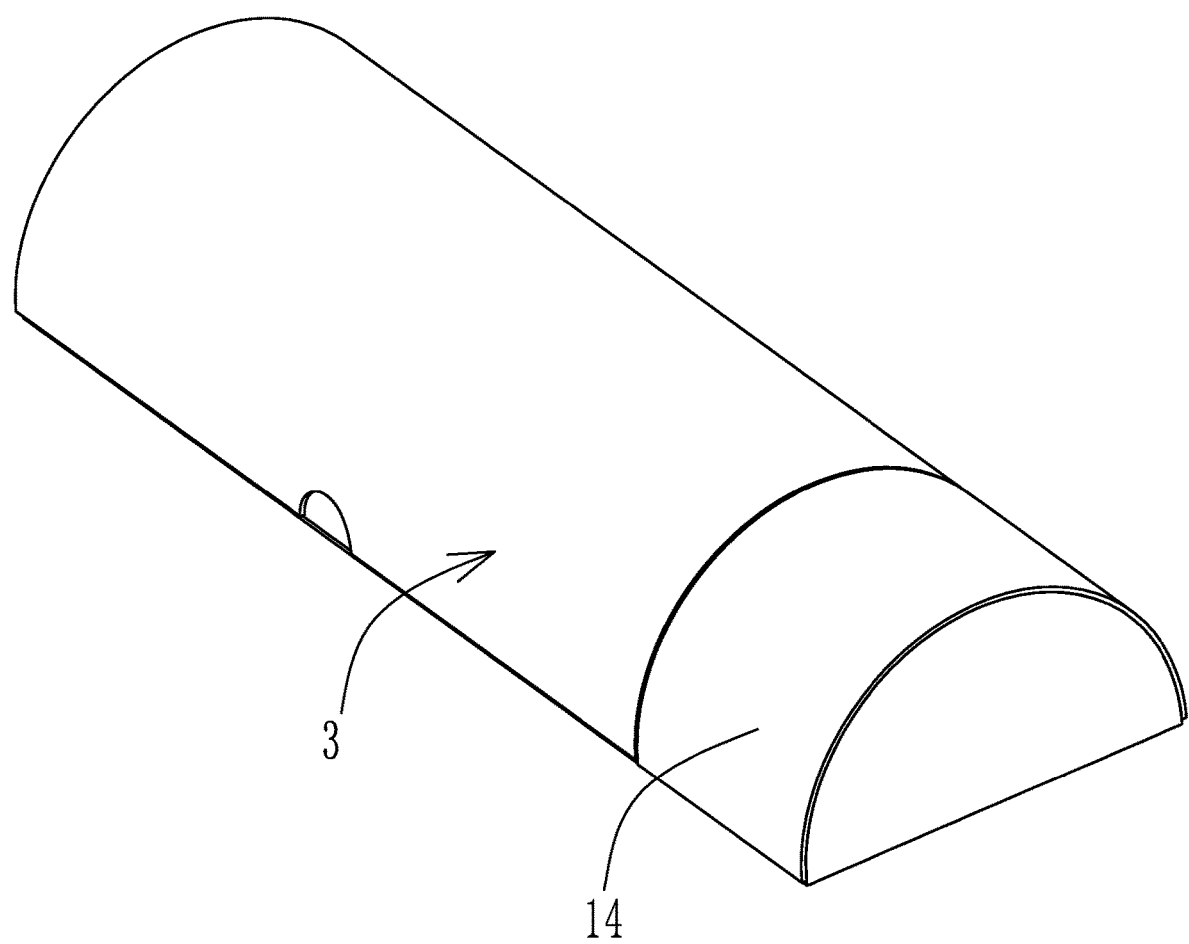
FIG. 9 is a schematic structural view of a whole semi-cylinder according to the present invention.
Figure 10:
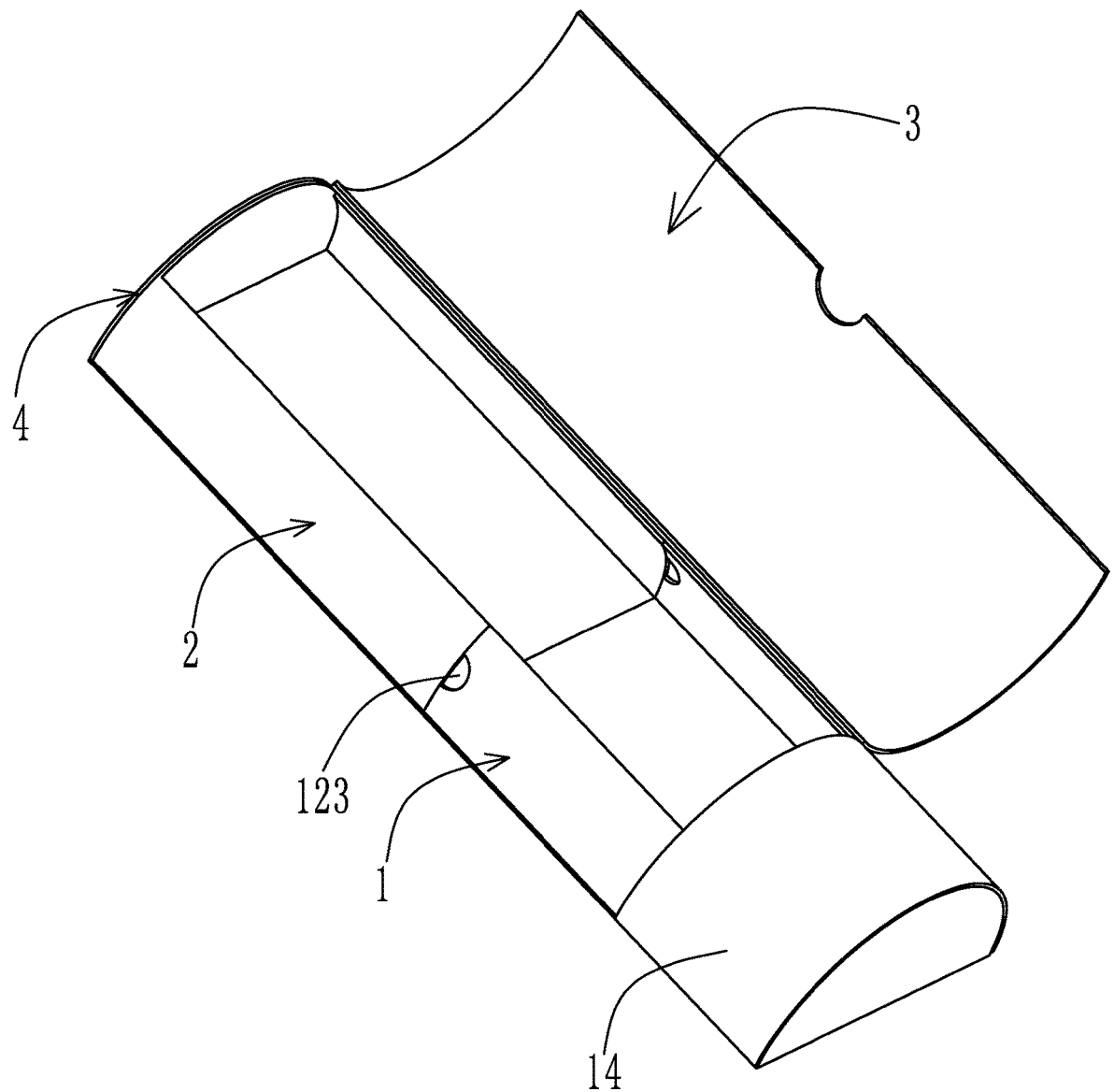
FIG. 10 is a schematic structural view of the flipped cover in FIG. 9.
Figure 11:
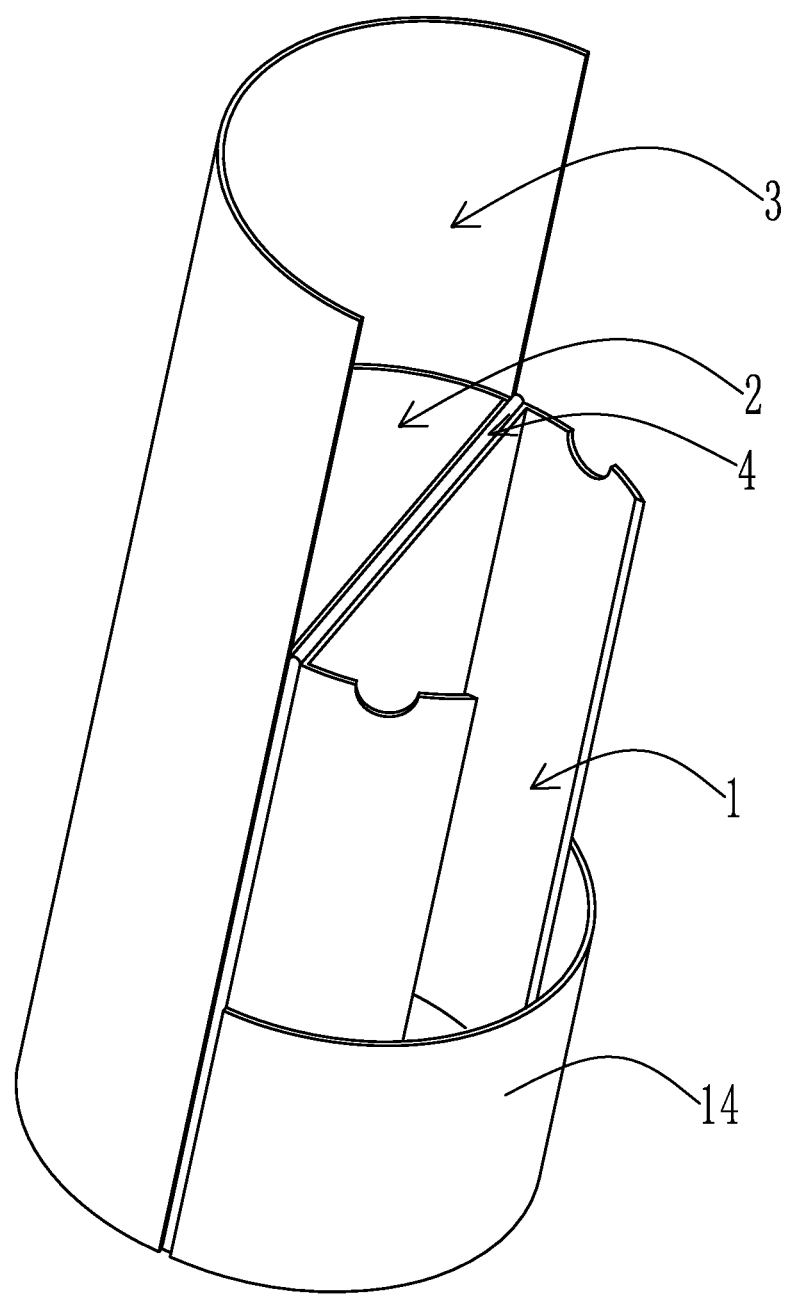
FIG. 11 is a schematic structural view of the first body or the second body in FIG. 9 when folded by 180 degrees.
Figure 12:
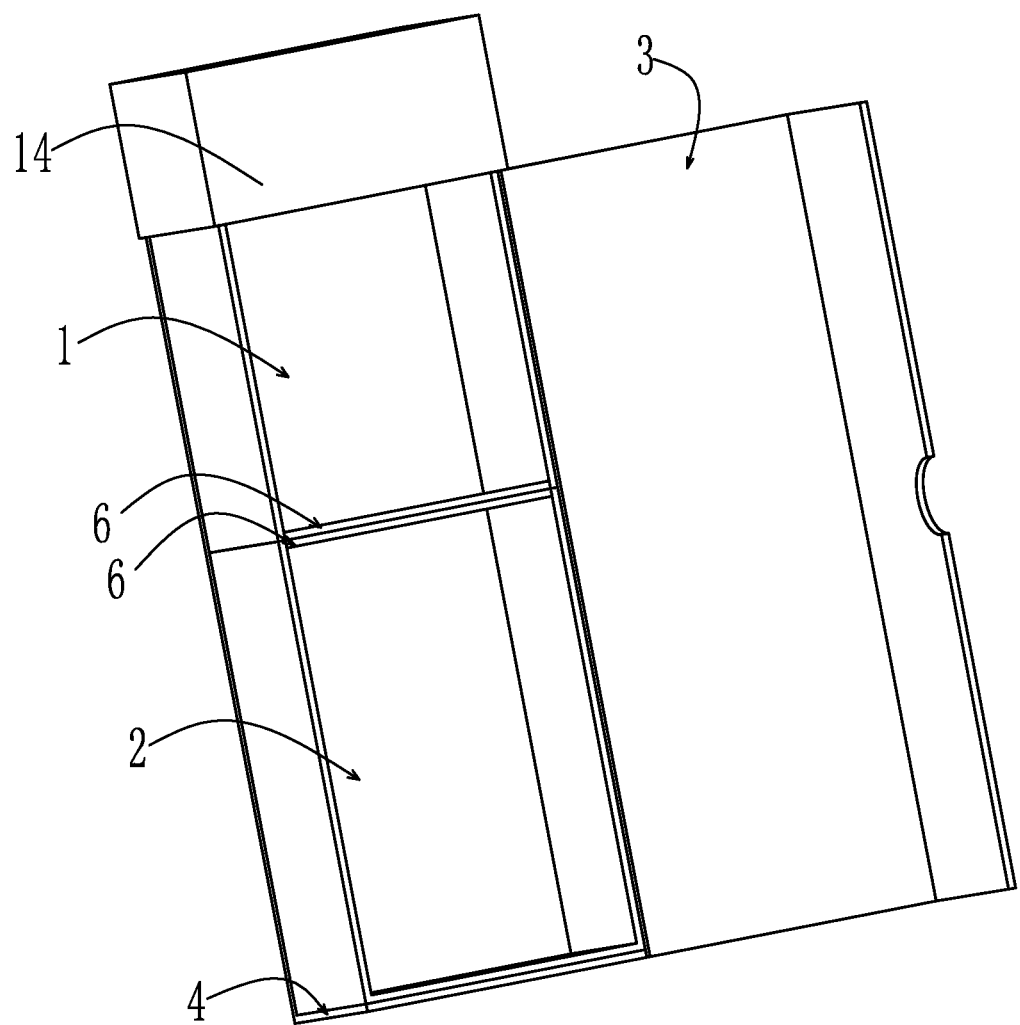
FIG. 12 is a schematic structural view of the baffle provided in the first side opening and the second side opening in FIG. 1.
Figure 13:
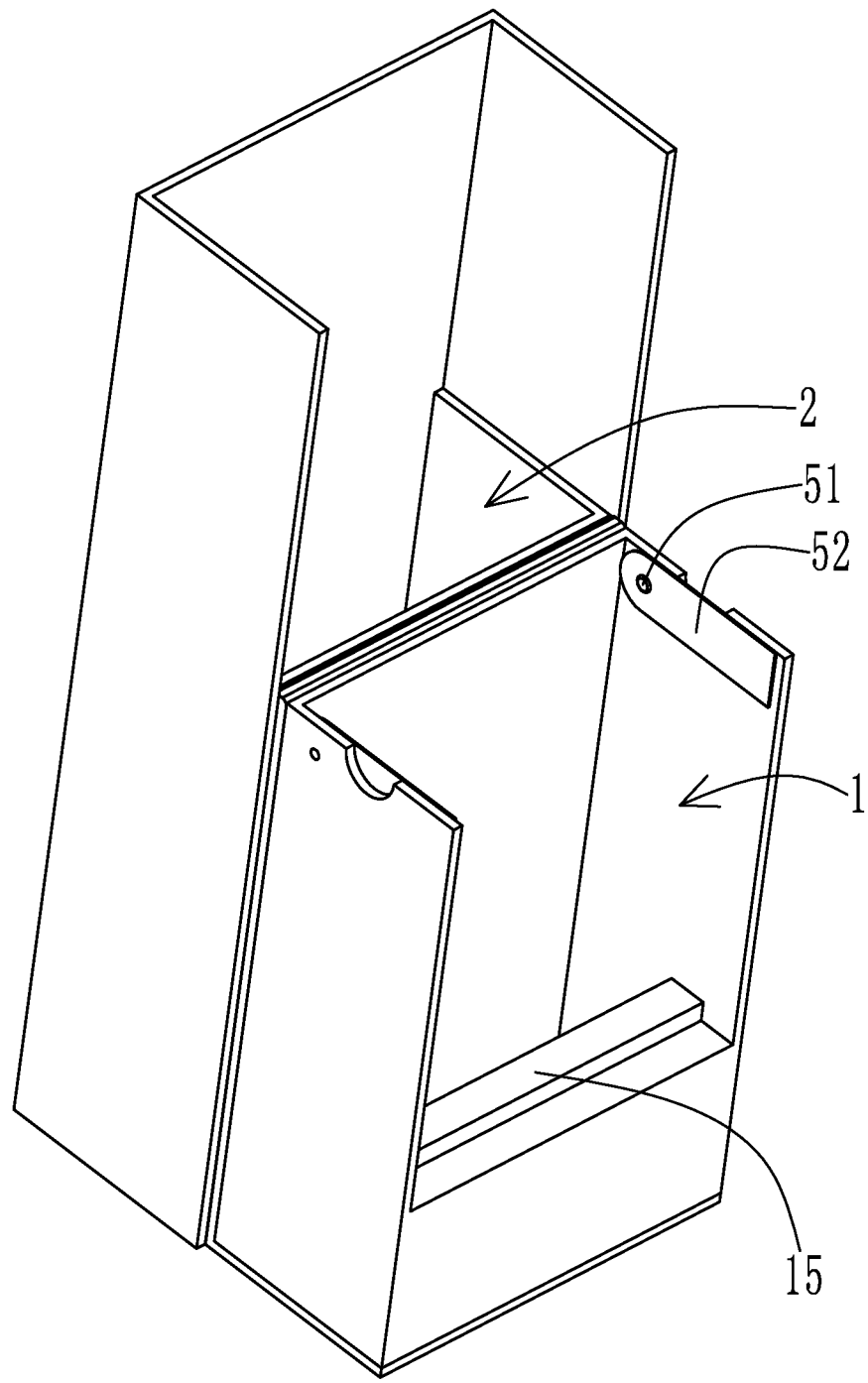
FIG. 13 is a schematic structural view of FIG. 6 when the C-shaped cover is removed.

As shown in FIGS. 8 and 9, the first body 1, the second body 2 and the flipped cover 3 are enclosed into a cuboid or semi-cylinder which is the most preferable shape of the present invention, but is not intended to limit the present invention; when the first body 1, the second body 2 and the flipped cover 3 are enclosed into a semi-cylinder, after the first body 1 or the second body 2 is folded by 180 degrees, and the first bottom plate 11 is in close contact with the second bottom plate 21, the first body 1 and the second body 2 form a cylindrical pencil holder, which is beautiful and practical.

The specific use of the present multi-functional storage box is as follows:

when the storage box is used as an ordinary pencil box, the first side opening 13 of the first body 1 and the second side opening 23 of the second body 2 abut against each other, the magnet 7 in the connecting plate 31 and the magnet 7 in the first side plate 122 at the overlapping area 33 are attracted to each other, and the first body 1 and the second body 2 are enclosed to form an upward-opening receiving cavity 16 for the storage; when the flipped cover 3 located on the opening of the receiving cavity 16 is opened, and the pencil, the ruler, and the eraser are put into the receiving cavity 16 from the opening of the receiving cavity 16, the flipped cover 3 is covered on the opening of the receiving cavity 16, so that the receiving cavity 16 is covered, and the magnet 7 in the suction plate 321 and the magnets 7 in the first side plate 122 and the second side plate 222 away from the side of the connecting plate 31 are attracted to each other, with the suction plate 321 sucked and attached to the first side plate 122 and the second side plate 222 away from the side of the connecting plate 31.

When the storage box is used as a pencil holder, the first bottom plate 11 and the second bottom plate 21 have a joint, and the first body 1 or the second body 2 is folded down by 180 degrees along the joint of the first bottom plate 11 and the second bottom plate 21; the magnets 7 in the first bottom plate 11 and the second bottom plate 12 are attracted to each other, so that the first bottom plate 11 and the second bottom plate 12 are sucked and attached to each other; the connection 4 is folded in half, and the two end plates 42 of the half-folded connections 4 are located on the same plane, so that when the pencil holder is placed on the top of a table, the large contact area between the bottom of the pencil holder and the top of a table can increase the stability of the pencil holder; the articles such as ruler and eraser can be put into the first body 1 from the first side opening 13 or put into the second body 2 from the second side opening 23.

When the storage box is used as a mobile phone holder, similarly, the first body 1 or the second body 2 is folded down by 180 degrees along the joint between the first bottom plate 11 and the second bottom plate 21; the magnets 7 in the bottom plate 11 and the second bottom plate 21 are attracted to each other, so that the first bottom plate 11 and the second bottom plate 21 are sucked and attached to each other; the openings of the slots 123 symmetrically provided on the two first side plates 122 face upward, and the opening of the limiting cavity 145 enclosed by the base 15 and the C-shaped cover 14 of the first body 1 also faces upward; when the mobile phone needs to be placed laterally, the mobile phone is laterally fixed in the slot 123, and the adjusting block can be adjusted as needed to adjust the tilting angle of the mobile phone; when the mobile phone needs to be vertically located, the mobile phone can be vertically placed in the limiting cavity 145.

When the storage box is used as a mobile phone holder of a car navigation, a snap 322 is added only on the basis of the above mobile phone holder; after the magnetic plate 323 is hinged on the inner side of the flipped plate 32 by way of a holder 324, the mobile phone is longitudinally located in the base 15, the back of the magnetic board 323 attached to the mobile phone is adjusted, and the mobile phone is fixed on the magnetic plate 323, so that the storage box can be used as a mobile phone holder of a car navigation.

Preferably, the storage box in the present invention can be made of different materials, such as PU, canvas and cotton; when a magnet 7 is enclosed in such materials, the magnet 7 cannot be seen on the surface to achieve a good appearance; the multi-functional storage box of a simple structure is economical and practical, and convenient for users to use, particularly regarding electronic products such as mobile phones.

The embodiments described herein are only intended to give examples based on the spirit of the present invention. Those skilled in the field can make various modifications or supplements or adopt alternative similarities to the described embodiments, without departing from the spirit of the present invention or exceeding the scope defined in the Claims connected.

What is claimed is:

1. A multi-functional storage box, comprising:
    a first body comprising a first bottom plate and a first side wall, wherein the first side wall is provided on the first bottom plate to form a first side opening;
    a second body comprising a second bottom plate and a second side wall, wherein the second side wall is provided on the second bottom plate to form a second side opening; the second bottom plate adjoins the first bottom plate, and both the first bottom plate and the second bottom plate can be folded down along a joint; the second side opening abuts against the first side opening, so that the first body and the second body are enclosed to form an upward-opening receiving cavity; one end of the second side wall adjoins one end of the first side wall to form a left wall of the receiving cavity, and the other end of the second side wall adjoins the other end of the first side wall to form a right wall of the receiving cavity;
    a flipped cover connected to the left wall or the right wall of the receiving cavity, wherein the flipped cover can be reversed to cover the opening of the receiving cavity;
    the first side wall comprises a first sealing plate and two first side plates, wherein the one first side plate is connected to the left side of the first bottom plate, and the other first side plate is connected to the right side of the first bottom plate, with the first sealing plate connected between the two first side plates;
    the second side wall comprises a second sealing plate and two second side plates, wherein the one second side plate is connected to the left side of the second bottom plate, and the other second side plate is connected to the right side of the second bottom plate, with the second sealing plate connected between the two second side plates;
    the flipped cover comprises a connecting plate and a flipped plate, wherein the connecting plate is connected to the second side plate, and the connecting plate and the first side plate form an overlapping area; and
    magnets having opposite magnetic poles are respectively provided in the connecting plate at the overlapping area and in the first side plate at the overlapping area.

2. The multi-functional storage box as claimed in claim 1, characterized in that the first bottom plate and the second bottom plate are provided with magnets for adsorbing and pasting the first bottom plate and the second bottom plate after the first bottom plate or the second bottom plate is folded.

3. The multi-functional storage box as claimed in claim 1, characterized in that a suction plate extends out of the flipped plate away from one side of the connecting plate; when the flipped plate is covered on the opening of the receiving cavity, the suction plate fits the first and second side plates away from the connecting plate.

4. The multi-functional storage box as claimed in claim 3, characterized in that a magnet is provided in the suction plate, and magnets with magnetic poles opposite to those in the suction plate are provided in the first and second side plates away from the side of the connecting plate.

5. The multi-functional storage box as claimed in claim 1, characterized in that the first body further comprises a C-shaped cover, wherein one end of the C-shaped cover is connected to the one first side plate, and the other end of the C-shaped cover is connected to the other first side plate.

6. The multi-functional storage box as claimed in claim 5, characterized in that a base is provided in the first body for longitudinally placing a mobile phone in the base, and the base and the C-shaped cover enclose a limiting cavity.

7. The multi-functional storage box as claimed in claim 6, characterized in that the first sealing plate is provided with a first socket and a first through slot, and the second sealing plate is provided with a second socket and a second through slot; when the first body and/or the second body are folded, the first through slot and the second through slot are in communication and used for the data line to be passed through.

8. The multi-functional storage box as claimed in claim 1, characterized in that two slots are symmetrically opened on the two first side plates adjacent to the side of the first side opening, with the openings of the slots facing the second body.

9. The multi-functional storage box as claimed in claim 8, characterized in that the slot is used for fixing a mobile phone which can be laterally placed in the slot; the first side plate is provided with a regulator for adjusting the tilting angle of the mobile phone fixed in the slot.

10. The multi-functional storage box as claimed in claim 9, characterized in that the regulator comprises a revolving pin and at least one adjusting block, wherein the adjusting block is hinged on the first side plate by the revolving pin.

11. The multi-functional storage box as claimed in claim 10, characterized in that the first bottom plate and the second bottom plate are connected by way of a connection, wherein the connection comprises a folded plate and an end plate connected at both ends of the folded plate; the one end plate is connected to the first sealing plate while the other end plate is connected to the second sealing plate, and the folded plate is connected to the bottoms of the first bottom plate and the second bottom plate.

12. The multi-functional storage box as claimed in claim 1, characterized in that a storage bag is provided on the inner side of the flipped plate and/or the first bottom plate.

13. The multi-functional storage box as claimed in claim 6, characterized in that a snap is provided on the outer side of the flipped plate.

14. The multi-functional storage box as claimed in claim 13, characterized in that a magnetic plate is provided on the inner side of the flipped plate and hinged on the flipped plate through a holder; the magnetic plate is used for adjusting the tilting angle of a mobile phone placed in the base or the slot and for fixing the mobile phone.

15. The multi-functional storage box as claimed in claim 1, characterized in that the first side opening and/or the second side opening are provided with a baffle for separating the receiving cavity.

16. The multi-functional storage box as claimed in claim 1, characterized in that the first body, the second body and the flipped cover are enclosed into a cuboid or semi-cylinder.

* * * * *